US012414543B2

(12) United States Patent
Pinhero

(10) Patent No.: US 12,414,543 B2
(45) Date of Patent: Sep. 16, 2025

(54) FLY MASK FOR AN ANIMAL

(71) Applicant: Jodi Pinhero, Fallbrook, CA (US)

(72) Inventor: Jodi Pinhero, Fallbrook, CA (US)

(*) Notice: Subject to any disclaimer, the term of this patent is extended or adjusted under 35 U.S.C. 154(b) by 0 days.

(21) Appl. No.: 17/498,224

(22) Filed: Oct. 11, 2021

(65) Prior Publication Data

US 2023/0116616 A1 Apr. 13, 2023

(51) Int. Cl.
*A01K 13/00* (2006.01)

(52) U.S. Cl.
CPC ................... *A01K 13/006* (2013.01)

(58) Field of Classification Search
CPC .................................... A01K 13/006
See application file for complete search history.

(56) References Cited

U.S. PATENT DOCUMENTS

| | | | | |
|---|---|---|---|---|
| 3,104,508 A * | 9/1963 | O'Hare, Jr. | .......... | A01K 13/006 D30/144 |
| 5,341,627 A * | 8/1994 | Eby | .............. | A01K 13/007 54/80.2 |
| 5,345,751 A * | 9/1994 | Edwards | .............. | A01K 13/006 54/80.2 |
| 6,128,891 A * | 10/2000 | McMahon | .......... | A01K 13/006 54/80.2 |
| 6,216,642 B1 * | 4/2001 | Hung | .............. | A01K 13/006 54/80.2 |
| 6,925,966 B1 * | 8/2005 | Wexler | .............. | A61D 9/00 119/815 |
| 7,204,071 B1 * | 4/2007 | Walker | .............. | B68C 5/00 54/80.2 |
| 9,277,732 B1 * | 3/2016 | Chrostowski | .......... | B68B 7/00 |
| 2002/0108586 A1 * | 8/2002 | Martin | .............. | A01K 13/006 119/850 |
| 2004/0103622 A1 * | 6/2004 | Nor | .............. | A61N 2/06 54/6.1 |
| 2004/0244342 A1 * | 12/2004 | Grogoza | .............. | A01K 13/006 54/79.4 |
| 2007/0169444 A1 * | 7/2007 | Hung | .............. | A01K 13/006 54/80.4 |
| 2008/0092497 A1 * | 4/2008 | Chang | .............. | A01K 13/006 54/80.2 |
| 2008/0295464 A1 * | 12/2008 | Larose | .............. | A01K 13/006 54/24 |
| 2009/0241856 A1 * | 10/2009 | Pressler | .............. | B68B 1/02 54/24 |

(Continued)

*Primary Examiner* — Magdalena Topolski
*Assistant Examiner* — Edgar Reyes
(74) *Attorney, Agent, or Firm* — Timothy A. Hodgkiss; Buckingham, Doolittle & Burroughs, LLC

(57) ABSTRACT

A fly mask for an animal, such as a horse, is configured with a plurality of replaceable sections or panels. The sections are formed from breathable material, such as a mesh material that is at least partially light-transparent. The various sections are removably joined together by fasteners, such as hook and loop material (e.g. VELCRO®), as well as snaps, zippers, clips, and the like. Thus, when one or more of the sections of the fly mask are damaged, only that particular section or panel requires replacement. As a result, the majority of the fly mask that is not worn out or damaged can then be reused. This avoids the expense and environmental waste associated with disposing of and replacing the entire fly mask, which is highly desirable.

19 Claims, 10 Drawing Sheets

(56) References Cited

U.S. PATENT DOCUMENTS

| | | | | |
|---|---|---|---|---|
| 2010/0043725 | A1* | 2/2010 | Hall | A01K 13/006 |
| | | | | 54/79.4 |
| 2011/0104312 | A1* | 5/2011 | Joseph | A01N 25/34 |
| | | | | 424/742 |
| 2011/0253064 | A1* | 10/2011 | Cates | A01K 13/006 |
| | | | | 119/850 |
| 2012/0036816 | A1* | 2/2012 | Gilligan | A01K 13/006 |
| | | | | 54/80.2 |
| 2012/0315317 | A1* | 12/2012 | O'Hara | A01N 25/34 |
| | | | | 54/6.1 |
| 2015/0113923 | A1* | 4/2015 | Wood | A01K 13/006 |
| | | | | 54/80.2 |
| 2015/0366164 | A1* | 12/2015 | Dyer, Jr. | A01M 1/14 |
| | | | | 54/80.2 |
| 2017/0215383 | A1* | 8/2017 | Moffat | A01K 15/02 |
| 2020/0018982 | A1* | 1/2020 | Whitaker | A01K 21/00 |

* cited by examiner

FLY MASK FOR AN ANIMAL

TECHNICAL FIELD

The various embodiments disclosed herein relate to accessories for animals. In particular, the various embodiments disclosed herein relate to fly masks for animals, such as horses. More particularly, the various embodiments disclosed herein relate to fly masks, which are constructed from individually removable sections that can be readily replaced with a new section.

BACKGROUND

A fly mask has been used as a convenient accessory to not only protect the face of a horse, but to keep irritants and other debris, such as flies, out of its eyes. In fact, a fly mask can be worn by the horse when it is resting or sleeping, when it is active and running, such as when the horse is being ridden. While fly masks may be formed of material that is completely opaque, they are often formed of a mesh or porous type of material that has some amount of optical transparency to allow the horse to be able to visually see therethrough. Thus, not only do fly masks provide an extremely useful device that physically protects the eyes of a horse from airborne environmental hazards, they also serve to reduce the spread of airborne pathogens, thereby improving the quality of life and health of the horse.

Unfortunately, these fly masks are susceptible to wear and tear from the movement of the horse and their interaction with various structures in their environment. For example, during the course of its daily life, a horse encounters and contacts many obstacles with its head, such as through brushing, hitting and rubbing up against fencing or other structural members that form its shelter or stall, as well as against the surfaces of transport vehicles, such as trailers, and the like. This abrasive interaction results in the wear of the fly mask, causing it to become damaged and worn out over time. In some cases, the area of the fly mask that receives a substantial amount of wear is the area of the fly mask that is fit over the horse's nose. As a result, even though the fly mask only experiences wear in a confined location, such as the horse's nose for example, it requires that the fly mask be completely replaced to ensure that it effectively provides protection to the horse, which is expensive and wasteful.

Currently, some fly masks offer a removable nose section, which allows a horse's owner to remove the nose section of the fly mask for various reasons, including: the nose section is bothering or affecting the horse and making it uncomfortable; the fly mask does not properly fit the horse's head with the nose section attached; or the nose section is not needed, such as in the case when the horse is being boarded and is housed in a stall. Alternatively, in the case when the nose section of the fly mask is worn and requires replacement, it may be removed. Unfortunately, manufacturers of current fly masks that have removable nose sections do not offer replacement nose sections to replace them when they are worn out.

Accordingly, to reduce the need to replace the entire fly mask when only a portion of the fly mask is experiencing wear, it would be desirable to provide fly masks where not only is the nose section removable, but other sections that form the fly mask are removable, and where all such sections are capable of being replaced with new corresponding sections. As such, offering fly masks that are configured with removable and replaceable sections would reduce the costs that would otherwise be associated with replacing the entire fly mask when only a specific portion of the fly mask, which has been exposed to substantial wear and tear only needs to be replaced. As a result, current fly masks cause substantial expense and environmental waste due to the entire fly mask needing replacement, often frequently, when in fact, only a portion of the overall fly mask is damaged or worn, which is highly undesirable.

Therefore, there is a need for a fly mask that has multiple panels or sections, which can be replaced with a new section when they become worn out or damaged. In addition, there is a need for a fly mask that has a structure that is formed of replaceable panels or sections. Still more, there is a need for a fly mask that incorporates replaceable panels or sections that covers one or more portions of an animal's head, including but not limited to its face, nose, ears and head/crown. Furthermore, there is a need for a fly mask that has multiple panels or sections that can be replaced with panels or sections of different characteristics, such as size, color, shape, material, light opacity for example.

SUMMARY

It is one aspect of the various embodiments disclosed herein to provide a fly mask for an animal having a pair of eyes including a first face section; a second face section removably attached to the first face section, wherein the first and second face sections are adapted to respectively cover the eyes of the animal; and a fastener adapted to releasably join the first and second face sections together to retain the fly mask to the animal.

It is another aspect of the various embodiments disclosed herein to provide a fly mask kit for an animal having a pair of eyes including a first face section and a second face section, wherein the first and second face sections are configured to be removably attached together, and are configured to be removably joined together to retain the first and second face sections around the head of the animal, such that the first and second face sections respectively cover the eyes of the animal; and a first crown section and a second crown section, wherein the first and second crown sections are configured to be removably attached together, and are configured to be removably attached to at least one of the first and second face sections, the first and second crown sections adapted to be positioned proximate to the crown of a head of the animal.

It is yet another aspect of the various embodiments of fly mask kit for an animal having a pair of eyes including a first face section and a second face section, wherein the first and second face sections are configured to be removably attached together, and are configured to be removably joined together to retain the first and second face sections around the head of the animal, such that the first and second face sections respectively cover the eyes of the animal; and a support strap connecting the first face section to the second face section, whereby the support strap is adapted to rest upon a neck of the animal.

BRIEF DESCRIPTION OF THE DRAWINGS

The various embodiments disclosed herein will become better understood with regard to the following description, accompanying drawings and claims, wherein:

DETAILED DESCRIPTION

Figure 1:
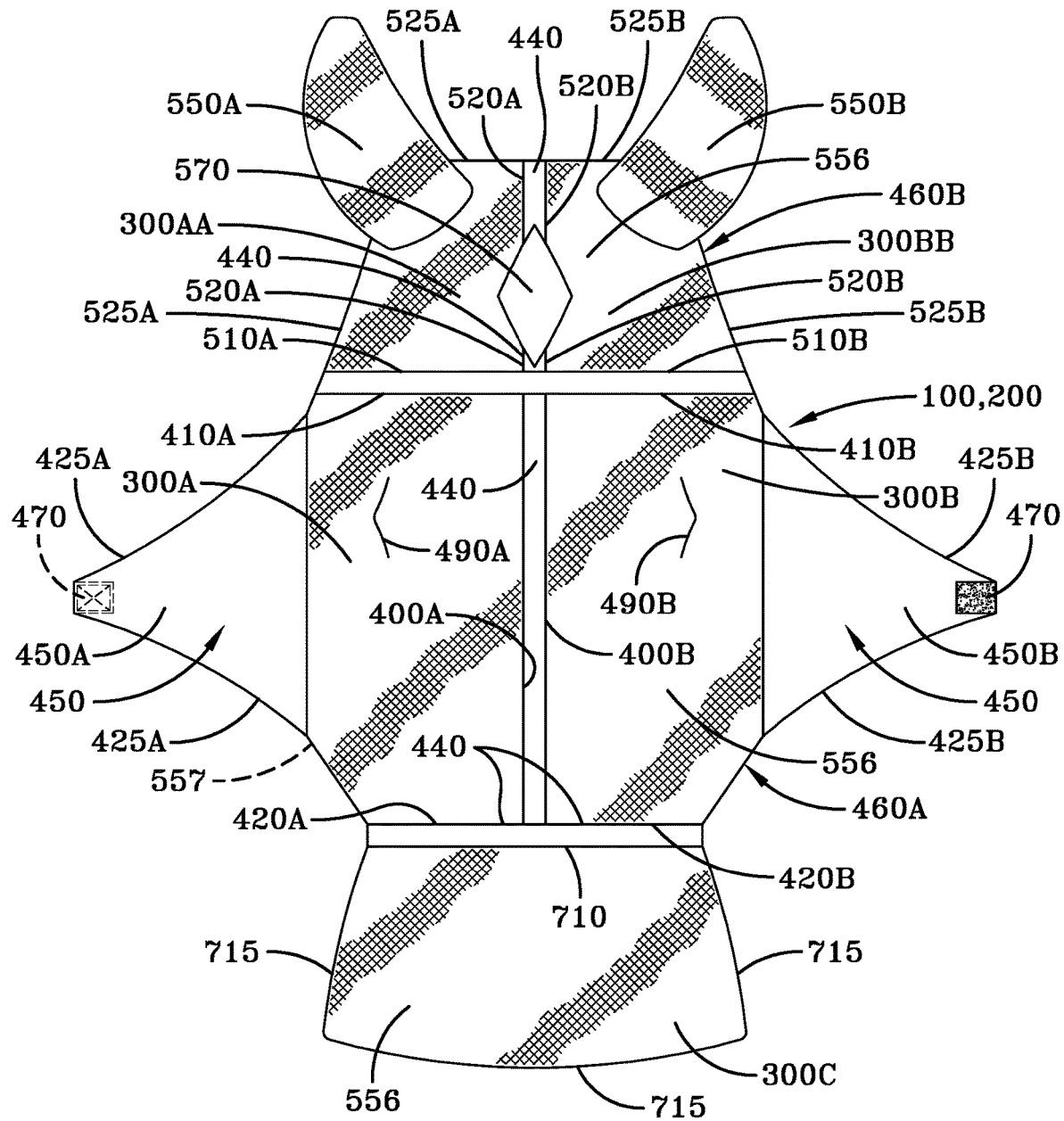
FIG. 1 is a top plan view of a fly mask in accordance with the various concepts disclosed herein.

A fly mask in accordance with the various embodiments disclosed herein, which is to be worn by an animal, such as a horse 10, is referred to by numeral 100 as shown in the FIGS. 1-7. The fly mask 100 is designed to be worn over the entirety, or a portion of, a head 120 of the horse 10. For example, the fly mask 100 may be configured, so as to cover the eyes 10A of the horse 10, as well as other portions of the horse's head, including its nose, face and crown. In particular, the mask 100 includes a body 200 that is formed of a plurality of removable sections 300 to be discussed in detail below. The sections 300 are configured to be removably joined to each other to form the complete structure of the fly mask 100. Because the sections 300 are able to be readily removed, a particular individual section 300 of the fly mask 100 that becomes damaged or worn, can be removed and replaced, without the need to replace the entire structure of the fly mask 100. It should be appreciated that while the discussion presented herein presents the fly mask 100 as being used with a horse 10, the fly mask 100 may be used with any animal, such as a donkey, zebra, or the like.

Face Sections:

Specifically, the fly mask 100 includes a pair of face sections 300A and 300B, which are configured to be positioned over a face portion 310 of the horse 10, so as to cover its eyes 10A. The face sections 300A and 300B are mirror images of each other and may be formed of any suitable material to be discussed in detail below. In particular, the face section 300A includes a face section attaching edge 400A, a crown section attaching edge 410A, a nose section attaching edge 420A, and an exterior edge 425A. Similarly, the face section 300B includes a face section attaching edge 400B, a crown section attaching edge 410B, a nose section attaching edge 420B, and an exterior edge 425B. In addition, the face sections 300A and 300B have an outer surface 556 and an inner surface 557.

Figure 2:
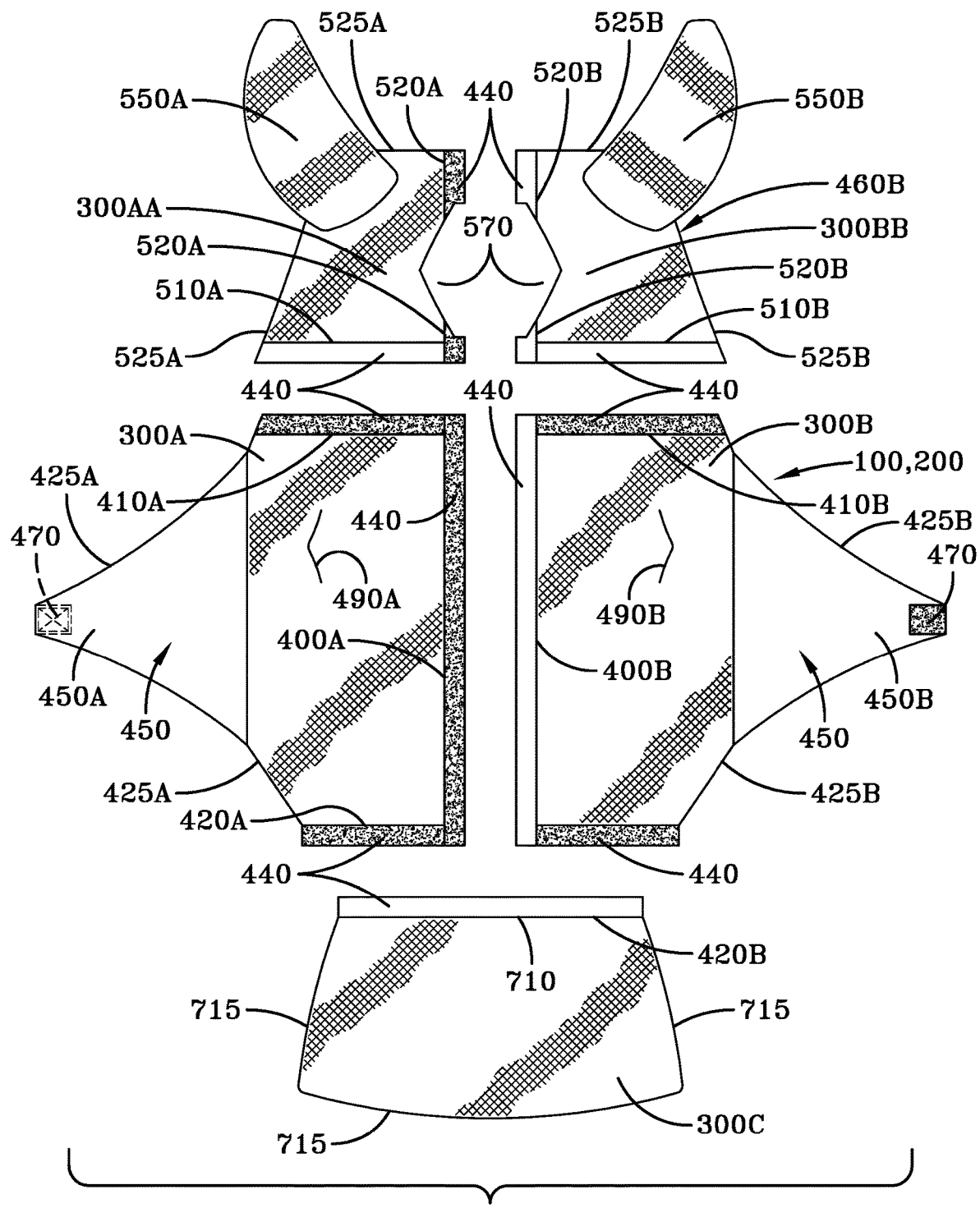
FIG. 2 is an exploded view of the fly mask in accordance with the various concepts disclosed herein.

The face section attaching edges 400A-B, the crown section attaching edges 410A-B, and the nose section attaching edges 420A-B of the face sections 300A-B include any suitable releasable fastener 440, such as a hook and loop material (e.g. VELCRO®), as well as snaps, zippers, clips, and the like. It should also be appreciated that the face section attaching edge 400A and the face section attaching edge 400B of the face sections 300A-B are joined together by the fastener 440 to form the face mask portion 460A of the fly mask 100, as shown in FIG. 1. In particular, as shown in FIG. 2, the face section 300A may include the fastener 440 on its outer surface 556 proximate to the face section attaching edge 400A, and the crown section attaching edge 410A, nose section attaching edge 420A. In addition, the face section 300B may include the fastener 440 its outer surface 556 proximate to the crown section attaching edge 410B and the nose section attaching edge 420B, while the fastener 440 is disposed on the inner surface 557 of the face section 300B proximate to the face section attaching edge 400B. However, it should be appreciated that such configuration should not be construed as limiting as the fastener 440 may be used in any suitable configuration desired.

To secure the face sections 300A and 300B to the horse 10 are configured to each include a retention device or fastener 450. In some embodiments, the fastener 450 may comprise snaps, zippers, clips, and the like that operate to selectively join the face sections 300A and 300B together about the head of the horse 10. In other embodiments, the fastener 450 may include one retaining strap 450A attached to the face section 300A, such as to exterior edge 425A, and another retaining strap 450B attached to the face section 300B, such as to the exterior edge 425B. The straps 450A and 450B may be joined by a fastener 470, which may be adjustable, and that allows a user to attach the straps together and to adjust the desired level of tightness imparted to the face sections 300A and 300B when they are positioned about the horse's head 120 and over its eyes 10A. In other words, the retention system 450 may comprise a 2-piece retention strap system having straps 450A and 450B that respectively extend from the face section 300A and the face section 300B. The straps 450A and 450B may be formed of the same material as the mask sections 300 or may be formed from any other suitable material, such as leather, nylon, or the like; stretchable or resilient material; as well as a combination thereof. In some embodiments, the fastener 470 utilized by the straps 450A and 450B to secure them together may comprise hook and loop material (e.g. VELCRO®), as well as snaps, zippers, clips and the like, so as to secure the face sections 300A and 300B together and to retain the mask 100 to the face 310 of the horse 10. Thus, when the face sections 300A and 300B are positioned on the horse 10, so as to form the face mask portion 460A, the straps 450A-B are positioned under a lower jaw 479 and in front of a neck 480 of the horse 10, to thereby retain the face mask portion 460A to the face 310 of the horse 10.

In some embodiments, the straps 450A-B may be replaced with a single section of resilient or stretchable material, such as elastic, that is configured to comfortably retain the face mask sections 300A-B to the horse 100.

In addition, each eye protrusions 490A and 490B provided by the respective face sections 300A-B, which are raised or elevated from the eyes 10A of the animal 10 when the fly mask 100 is attached to the horse 100. That is, the eye protrusions 490A and 490B provide a space or gap between the fly mask 100 and the animal's eyes 10A. This prevents the fly mask 100 from contacting and possibly abrading and injuring the animal's eyes 10A when the fly mask 100 is worn. In some embodiments, the protrusions 490A-B may be configured as fabric darts that form a gathering of material. This creates a pucker or bulge in the material forming the face sections 300A-B to thereby form the space or gap between the animal's eyes 10A and the face sections 300A-B of the fly mask 100.

It should also be appreciated that the protrusions 490A-B may be configured as pre-formed molded regions or areas in the material forming the face sections 300A-B. For example, the molded regions or areas forming the protrusions 490A-B may comprise a rigid body, such as that formed of plastic for example, or may be molded or formed directly into the fabric or material that forms the face sections 300A-B. The eye protrusions 490A-B, such as the rigid/molded plastic protrusions are formed of transparent or at least partially transparent material to allow the horse 10 to see therethrough.

It should also be appreciated that the rigid protrusions 490A-B may be configured as inserts or lenses that may be snap-fit or friction-fit into corresponding apertures disposed in the face sections 300A-B of the fly mask 100. As such, the rigid protrusions may have different sizes, shapes, and opacities for light for example, to accommodate the particular preferences of the horse 10.

It is also contemplated that each face section 300A and 300B may be formed of multiple sections instead of the single section shown in the Figs., which are joined by the fastener 440, which may include hook and loop material (e.g. VELCRO®), as well as snaps, zippers, clips and the like.

Crown Sections:

The fly mask 100 also includes a pair of crown sections 300AA and 300BB, which are configured to fit over a crown 490 of the horse's head 120. The crown sections 300AA and 300BB are mirror images of each other and may be formed of any suitable material to be discussed in detail below. In particular, the crown section 300AA includes a face section attaching edge 510A, a crown section attaching edge 520A, and an exterior edge 525A. Similarly, the crown section 300BB includes a face section attaching edge 510B, a crown section attaching edge 520B, and an exterior edge 525B. In addition, the crown sections 300AA and 300BB have an outer surface 556 and an inner surface 557.

The face section attaching edges 510A-B of the crown sections 300AA and 300BB are configured to be removably attached to the crown section attaching edges 410A-B respectively of the face sections 300A and 300B by the fastener 440, which may include hook and loop material (e.g. VELCRO®), as well as, snaps, zippers, clips and the like. It should be appreciated that the crown section attaching edges 520A and 520B of the crown sections 300AA and 300BB are configured to be removably attached together by the releasable fastener 440, to form the crown mask portion 460B, as shown in FIG. 1.

In one embodiment, as shown in FIG. 2, the crown section 300AA may include the fastener 440 on the outer surface 556 proximate to the crown section attaching edge 520A and on the inner surface 557 proximate to the face section attaching edge 510A. In addition, the crown section 300BB may include the fastener 440 on the inner surface 557 proximate to the crown section attaching edge 520B and proximate to the face section attaching edge 510B. However, it should be appreciated that such configuration should not be construed as limiting as the fastener 440 may be used in any suitable configuration desired.

In addition, each of the crown sections 300AA and 300BB respectively may include ear covers 550A and 550B, which are configured to receive therein and accommodate the ears 560 of the horse 10. The ear covers 550A-B may be formed of any suitable material, and in some embodiments, it may be formed from the same material as the sections 300 to be discussed, as well as air breathable or porous material, such as mesh or perforated material for example. That is, the ear covers 550A-B may be permanently attached to the crown sections 300AA-BB, such as through any suitable means of fixation, including stitching, adhesive, rivets and the like.

Figure 2A:
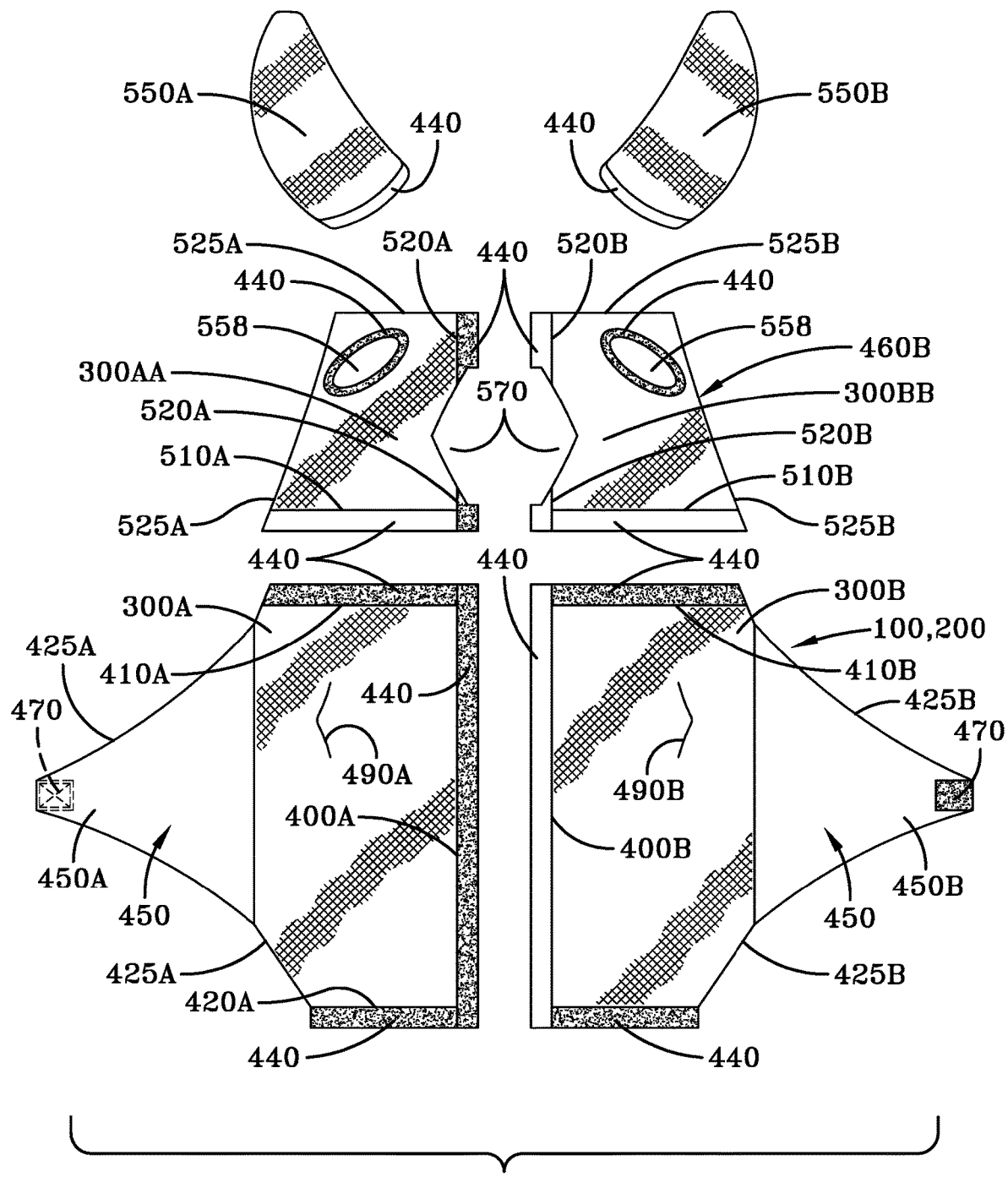
FIG. 2A is an exploded view of an alternative fly mask showing the fly mask with removable ear covers and exposed ear cover openings in accordance with the various concepts disclosed herein.

Alternatively, as shown in FIG. 2A, the ear covers 550A-B may be configured to be removably attached to the crown sections 300AA-BB by the releasable fastener 440, such as by hook and loop material (e.g. VELCRO®), as well as, snaps, zippers, clips and the like. As such, when the ear covers 550A-B are removed from the crown sections 300AA and 300BB, corresponding ear openings or apertures 558 are revealed in the crown sections 300AA-BB, also shown in FIG. 2A. In this case, the ears 560 of the horse 10 may be protrude through the openings or apertures 558 in the crown sections 300AA-BB.

In addition, it should be appreciated that in some embodiments of the fly mask 100, the ear covers 550A-B may be integrated directly, such as through a sewn attachment for example, to the crown sections 300AA-BB.

In other embodiments of the fly mask 100, the crown sections 300AA-BB may be configured to include only the ear apertures of openings 558, without the use of the ear covers 550A-B being attached thereto.

Figure 3:
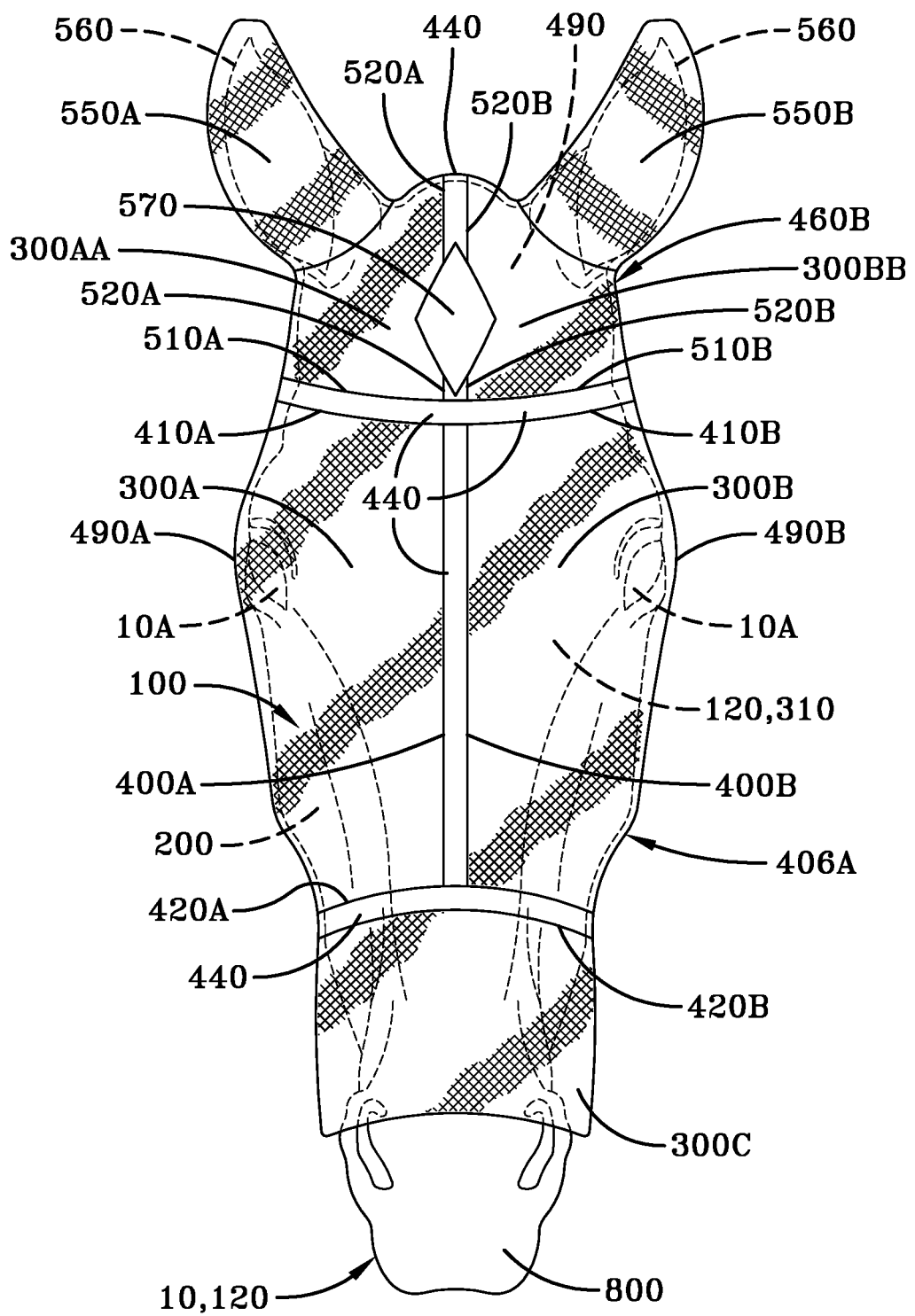
FIG. 3 is a front perspective view of the fly mask when worn on the head of a horse in accordance with the various concepts disclosed herein.

In some embodiments, the crown mask portion 460B, formed by the crown sections 300AA and 300BB, may be configured to include a forelock aperture 570. The forelock aperture 570 is provided to allow a forelock (not shown) of the horse 10 to extend therethrough. In addition, the aperture 570 may be configured as any suitable shape, but in some embodiments the aperture 570 may be annular, triangular, or diamond shaped, thus the aperture 570 may be curvilinear, rectilinear, or a combination of both. In particular, the aperture 570 may be defined by separate forelock aperture segments 570A and 570B disposed in respective crown sections 300AA and 300BB, shown clearly in FIG. 2. Thus, when the crown section 300AA and crown section 300BB are joined together by releasable fastener 440, as shown in FIGS. 1 and 3, the completed forelock aperture 570 is formed. However, it should be appreciated that in other embodiments, the forelock aperture 570 may be entirely disposed in either one of the crown section 300AA or the crown section 300BB.

It is also contemplated that each crown section 300AA and 300BB may be formed of multiple sections instead of the single section shown in the Figs., which are joined by the releasable fastener 440, which may include hook and loop material (e.g. VELCRO®), as well as snaps, zippers, clips and the like.

Nose Section:

The fly mask 100 also includes a nose section 300C to cover, or at least partially cover, a nose 800 of the horse 10. The nose section 300C has a face attaching edge 710 and an exterior edge 715, as well as an inner surface 557 and an outer surface 558. The face section attaching edge 710 of the nose section 700 includes the releasable fastener 440, which may include hook and loop material (e.g. VELCRO®), as well as snaps, zippers, clips and the like. As such, the nose section 300C is configured to be removably attached via the face section attaching edge 710 to the nose section attaching edges 420A-B of the face sections 300A-B.

In one embodiment, as shown in FIG. 2, the nose section may include the fastener 440 on the inner surface 557 proximate to the face attaching edge 710. However, it should be appreciated that such configuration should not be construed as limiting as the fastener 440 may be used in any suitable configuration desired.

In addition, the nose section 700C may be configured to cover one or more of the top, and in some cases the side portions, of the horse's nose 800.

It is also contemplated that the nose section 300C may be configured in as multiple sections instead of the single section shown in the Figs., which are joined by the releasable fastener 440, which may include hook and loop material (e.g. VELCRO®), as well as snaps, zippers, clips and the like.

Alternative Embodiment

Figure 7A:
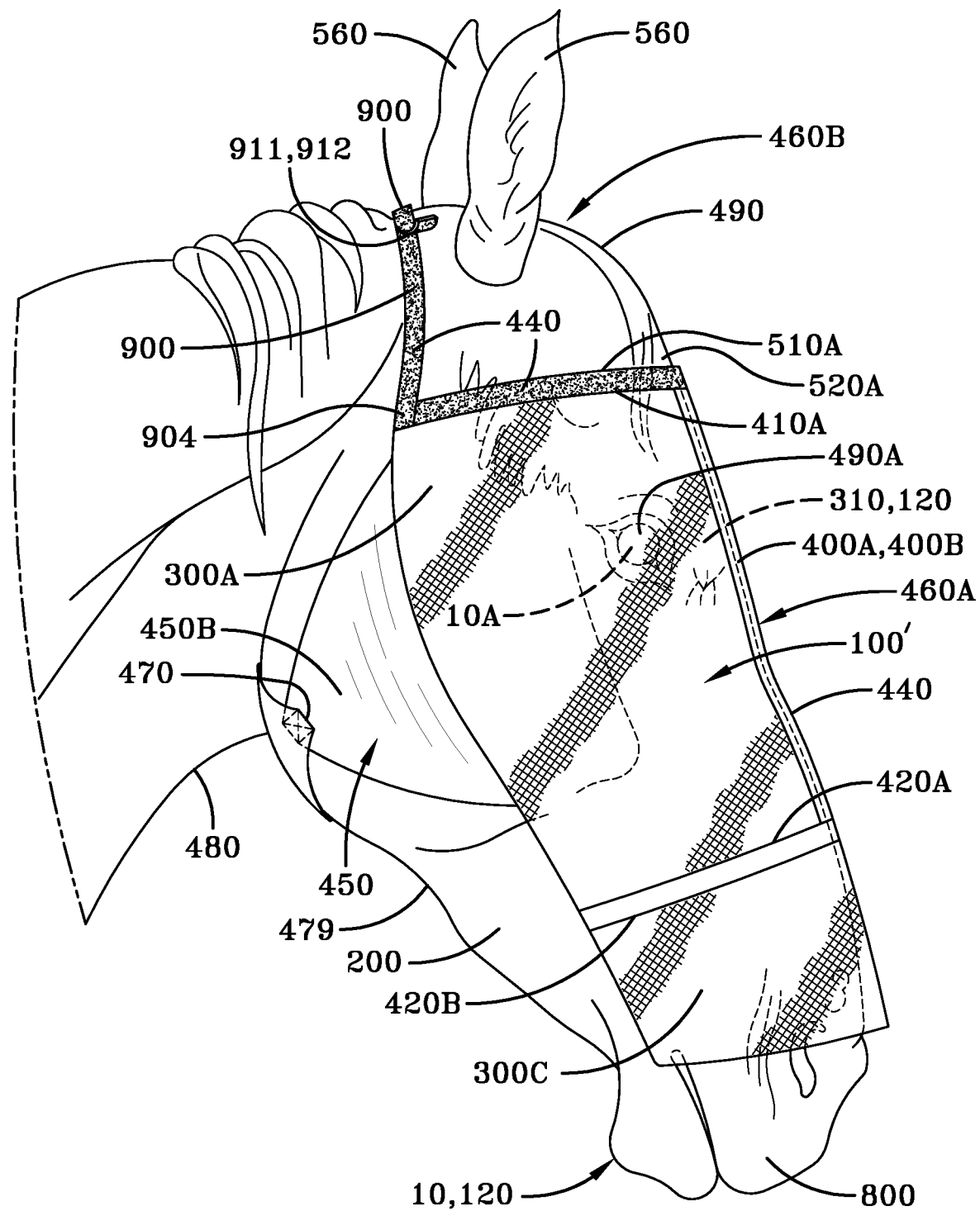
FIG. 7A is a side elevation view of an alternative embodiment of the fly mask that does not utilize the crown sections, and that incorporates a support strap in accordance with the various concepts disclosed herein.

In another embodiment of the fly mask referred to by numeral 100', it should be appreciated that the face sections 300A-B (i.e. face mask portion 460A) may be utilized without the use of the crown sections 300AA-BB (i.e. crown mask portion), as shown in FIG. 7A. That is, the fly mask 100' allows the face sections 300A-B to be properly supported and attached to the animal's face 300 without the use of the crown sections 300AA-BB. Accordingly, the face sections 300A-B include a support strap 900 that joins the face section 300A to the face section 300B. Specifically, one end 904 of the support strap 900 is attached to the face section 300A at a point proximate to the lateral extent of the face section 300A. Similarly, another end 906 of the support strap 900 is attached to the face section 300B at a point proximate to the lateral extent of the face section 300B. In some embodiments, the support strap 900 may comprise a flat cross-section having an inner surface 900 and an outer surface 922. However, it should be appreciated that the support strap 900 may comprise any suitable cross-sectional shape, such as a rectilinear shape, a curvilinear shape or a combination thereof. It should be appreciated that the support strap 900 may also have ends 911 and 912 that allows the support strap to be selectively joined together, such as through any removable fastener, such as hook and loop material (e.g. VELCRO®), as well as snaps, zippers, clips and the like. However, the ends 911 and 912 may be removed that the support strap 900 may be a one continuous section.

The support strap 900, as shown in FIG. 7A, may in some embodiments include any suitable material, such as, leather, nylon, or the like for example. In some embodiments, the support strap 900 may be formed of a resilient material that is stretchable.

In some embodiments, the inner surface 922 of the support strap 900 is configured to be positioned adjacent to the animal when the fly mask 100' is being worn and may be lined with a soft or padded material in some cases. For example, the lining may comprise cotton material, leather, such as chamois leather, and the like to increase the comfort to the animal 10.

Figure 7B:
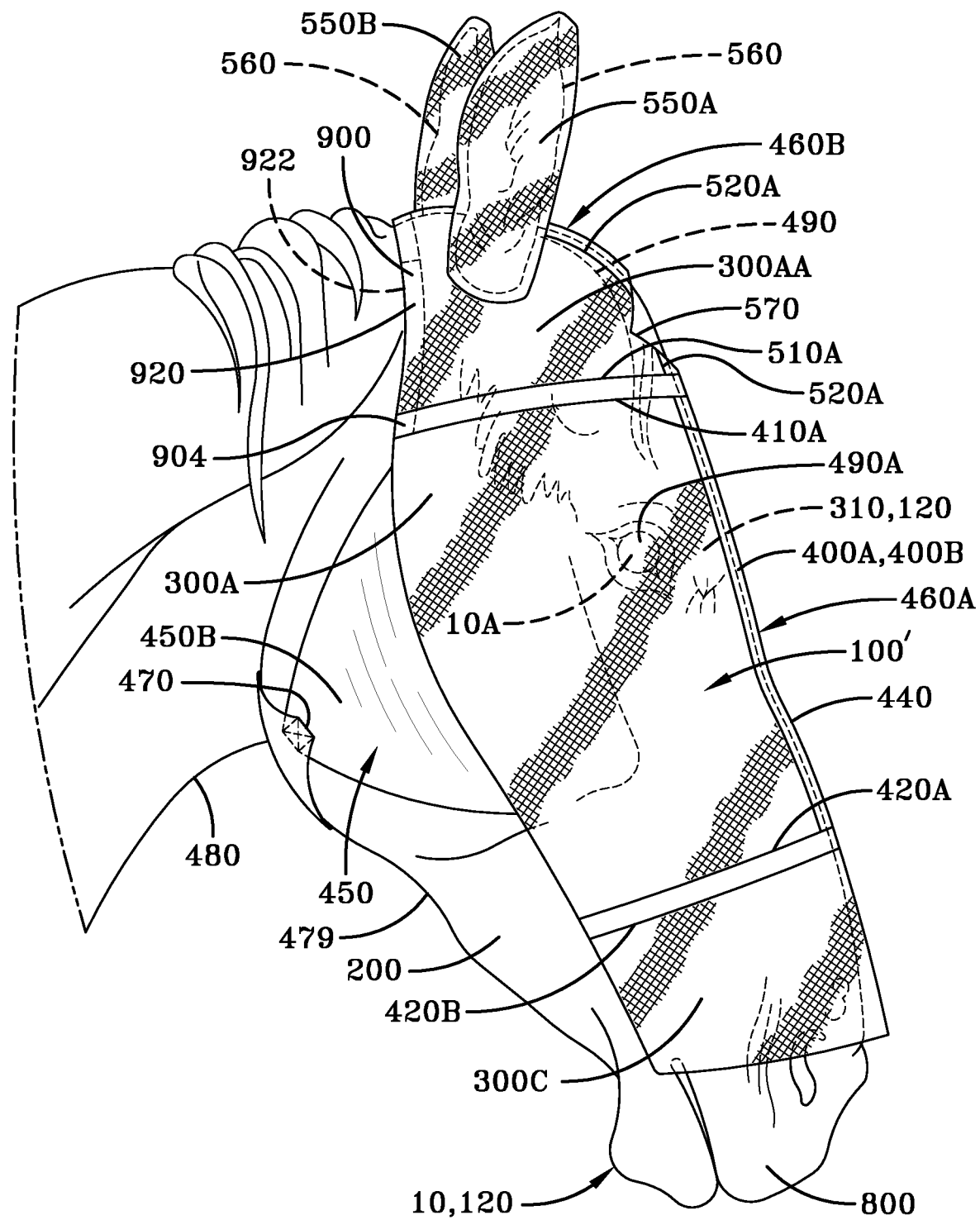
FIG. 7B is another side elevation view of the alternative embodiment of the fly mask shown in FIG. 7A showing the crown sections removably attached in accordance with the various concepts disclosed herein.
Figure 7C:
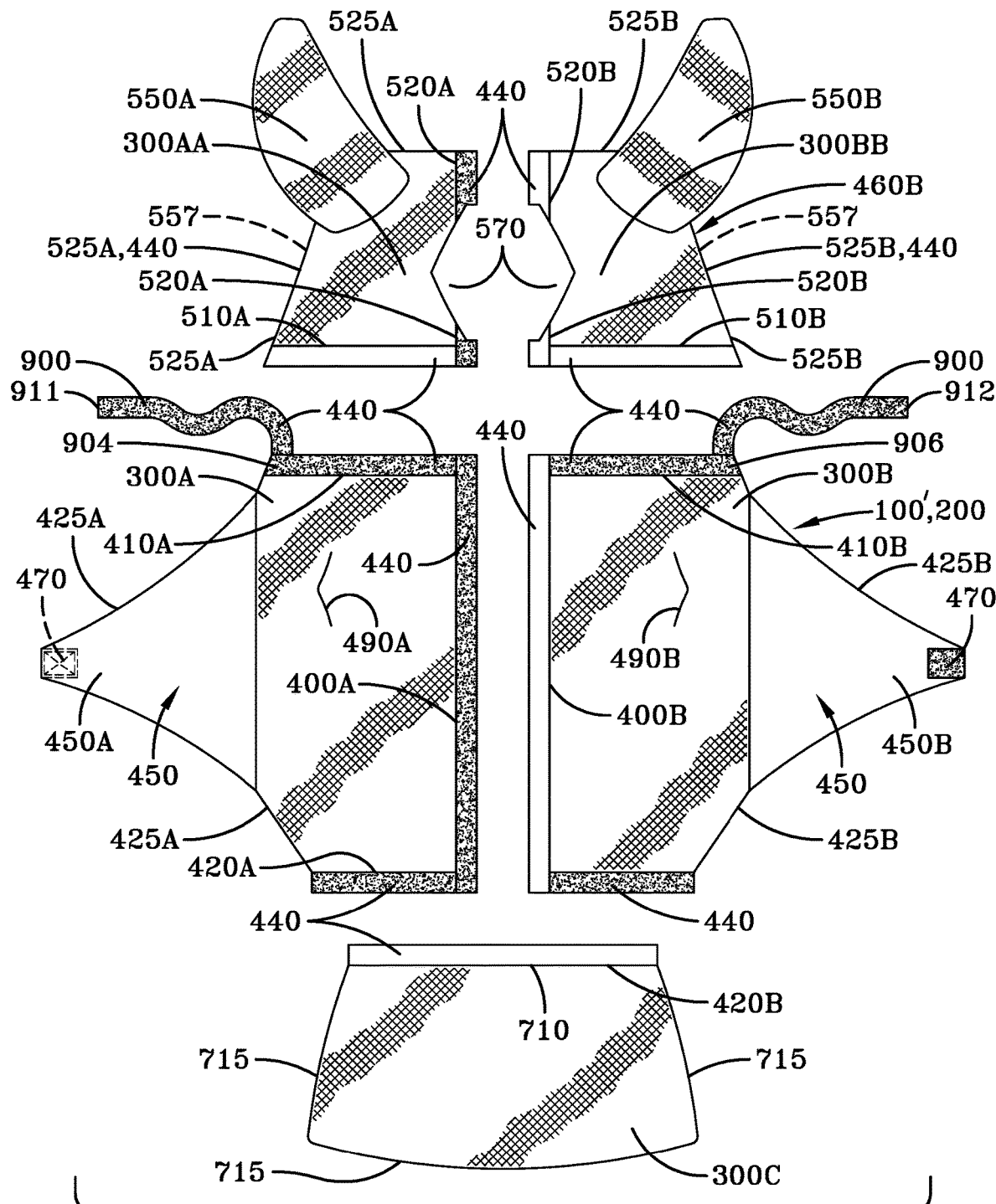
FIG. 7C is an exploded view of the alternative embodiment of the fly mask shown in FIG. B in accordance with the various concepts disclosed herein.

In alternative embodiments, the crown sections 300AA-BB may be optionally removably attached to the fly mask 100'. As such, the outer surface 920 of the support strap 900 that is distal from the animal 10 when the fly mask 100' is worn includes the releasable fastener 440. This allows for the removable attachment of the crown sections 300AA and 300BB to the fly mask 100', as shown in FIGS. 7B-C. That is, the crown sections 300AA-BB of the fly mask 100' may be configured to include the releasable fastener 440 so that the crown sections 300AA-BB can be releasably attached to the support strap 900. Specifically, the releasable fastener 440 is positioned on the inner surface 557 of the crown section 300AA at a point proximate to its exterior edge 525A and the face section attaching edge 510A. Similarly, the releasable fastener 440 is positioned on the inner surface 557 of the crown section 300BB at a point proximate to its exterior edge 525B and the face section attaching edge 501B. As such, the releasable fastener 440 positioned proximate to the exterior edges 525A-B of the crown sections 300AA-BB is configured to be attached to the releasable fastener 440 that is positioned on the outer surface 920 of the support strap 900, as well as to the fastener 400 provided on the outer surface 556 of the face sections 300A-B, proximate to the face section attaching edge 510.

It should also be appreciated that each of the crown sections 300AA and 300BB configured for use with the fly mask 100' may include ear covers 550A and 550B, which are configured to receive therein and accommodate the ears 560 of the horse 10. That is, the ear covers 550A-B may be permanently attached to the crown sections 300AA-BB through any suitable means of fixation, such as stitching, adhesive, rivets, and the like. Alternatively, the ear covers 550A-B may be removably attached to the crown sections 300AA-BB by the releasable fastener 440, such as by hook and loop material (e.g. VELCRO®), as well as, snaps, zippers, clips, and the like, as previously discussed. It should be appreciated that in some embodiments, kits may be provided, which are discussed in detail below, that include multiple crown sections 300AA-BB having different sizes that also include ear covers 550 of different sizes.

Options:

It should also be appreciated that the fly mask 100/100' may also include an information section to include the name or identifying information associated with the horse, as well as any other information that is desired. In some embodiments, the information section may comprise a space, a plate, a section or the like formed of any suitable material. The information section permits a user to place identifying indicia thereon, such as through writing with a pen or marker, or with pre-printed adhesive decals for example. In some embodiments, the information section may be positioned on the fastener 450, as well as on any other section 300 of the fly mask 100/100'.

Material:

The various sections 300, including the face sections 300A-B, the crown sections 300AA-BB, the nose section 300C, and the ear covers 550A-B of the fly mask 100/100' may be formed from any suitable material, such as fabric, metal, plastic, polymeric material, or a combination or hybrid thereof. It should also be appreciated that the material used to form one or more of the face sections 300A-B, the crown sections 300AA-BB, the nose section 300C, and the ear covers 550A-B of the fly mask 100/100' may comprise light-transparent or at least partially light-transparent material. It should also be appreciated that in some embodiments, the face mask portion 460A, the crown mask portion 460B, the nose section 300C and ear covers 550A-B may be formed of the same material or may be formed of different materials from each other. For example, the crown mask portion 460B and/or the nose section 300C may be formed of opaque material, while the face mask portion 460A that is positioned over the eyes of the horse 10 is formed of at least partially transparent material. Furthermore, in such an embodiment, the crown mask portion 460B and/or the nose section 300C may be formed of light opaque or light blocking material, such as nylon or leather (e.g. chamois leather) for example, while the face mask portion 460A is formed of an at least partially light-transparent material.

It should also be appreciated that in some embodiments the material used to form the various sections 300, as well as the ear covers 550A-B, may encompass stretchable material, such as SPANDEX® or stretch LYCRA® for example, or may be formed of other material, such as fine mesh nylon, cotton, or polyester. For example, in some embodiments, the face sections 300A-B, crown sections 300AA-BB and nose section 300C may be formed of stretchable material, as previously discussed, while the ear covers 550A-B may be formed of cotton, cotton blend fabric, polyester, or polyester mesh fabric for example.

In some embodiments, one or more of the face sections 300A-B, crown sections 300AA-BB and nose section 300C, and ear covers 550A-B may be formed of leather (e.g. chamois leather) material, such as perforated leather.

In addition, in some embodiments, the fly mask 100/100' may be formed, whereby the face mask portion 460A and the crown mask portion 460B are both formed of a perforated material or of a porous mesh material. However, in other embodiments, the face mask portion 460A may be formed of different materials, whereby one of the face mask portion 460A or the crown mask portion 460B is formed of porous mesh material, while the other portion is formed of perforated material. In addition, the ear covers 550A-B and nose section 300C may also be formed of porous mesh or perforated material. The porous mesh material and the perforated material are configured to provide breathability and to improve the comfort of the animal wearing the fly mask 100/100'.

It is also contemplated that one or more of the face sections 300A-B, the crown sections 300AA-BB, the nose section 300C, and ear covers 550A-B may be formed of material that provides UV (ultraviolet) light protection to the animal. That is, the face sections 300A-B, the crown sections 300AA-BB, and the nose section 300C may be treated with UV light resistant or blocking material to prevent the penetration of UV light to the animal wearing the fly mask 100/100'.

It should be appreciated that the fly mask 100 may be formed of any suitable size and dimension to accommodate horses 10 of different shapes and sizes.

It should also be appreciated that the material used to form the fly mask 100 may have any design or print thereon. In some embodiments, one or more of the sections 300A, 300B, 300AA, 300BB, 300C and ear covers 550A-B may be formed of light reflective material. In some embodiments, one or more edges 400A-B, 410A-B, 420A-B and 425A-B of the face sections 300A-B may include reflective material; and/or one or more edges 510A-B, 520A-B and 525A-B of the crown sections 300AA-BB may include reflective material; and/or one or more edges 710 and 715 of the nose section 300C may include reflective material.

Lining and Padding:

As previously discussed, the fly mask 100/100' formed by the face sections 300A and 300B (face mask portion 460A), the crown sections 300AA and 300BB (crown mask portion 460B), the nose section 300C and the ear covers 550A-B has an outer surface 556 and an inner surface 557. The inner surface 557 of the fly mask 100/100' is configured to be placed adjacent to the animal's head 120. Furthermore, the inner surface 557 may be configured to include a lining material thereon. In addition, the lining material may be positioned adjacent to one or more edges of the various sections 300A-B, 300AA-BB, 300C and the ear cover openings 558 of the fly mask 100/100'. In other words, the lining material may be placed on the inner surface 557 of the fly mask 100/100' and/or positioned adjacent to one or more of the edges 400A-B, 410A-B, 420A-B and 425A-B of the face sections 300A-B; positioned adjacent to one or more of the edges 510A-B, 520A-B, and 525A-B of the crown sections 300AA-BB; and adjacent to one or more of the edges 710 and 715 of the nose section 300C. In addition, the lining material may be positioned on the inner surface 557 of the fly mask 100/100' and proximate to the ear openings 558.

It should also be appreciated that the lining material may comprise any suitable material that is different than that used to form the various sections 300. In some embodiments, the lining material may comprise any suitable material that is softer than the material used to form the various fly mask sections 300. In some cases, the lining material may include leather (e.g. chamois leather), fleece material, polyester material, cotton material or a combination thereof. In other embodiments, the lining material may be padded with a separate material, such as foam or other resilient material, to improve the comfort to the animal 10 when the fly mask 100/100' is worn.

Removable Section Configuration:

Accordingly, the fly mask 100/100' is configured from the various sections 300 (i.e. 300A, 300B, 300AA, 300BB, and 300C) and ear covers 550A-B, which are each removably joined or attached to one another by the releasable fastener 440, such as hook and loop material (e.g. VELCRO®), as well as snaps, zippers, clips and the like. This allows a user to easily and conveniently remove and replace a particular section 300 (i.e. 300A, 300B, 300AA, 300BB, and 300C) and ear cover 550A-B of the fly mask 100, such as in the case where they become worn or damaged through use, without the need to replace the entire fly mask 100.

It should be appreciated that in some embodiments only the face mask portion 460A may be utilized to form the fly mask 10 without the need to use the crown mask portion 460B or the nose section 300C. Alternatively, it should be appreciated that the face mask portion 460A may be used with one or more of the crown mask portion 460B or the nose section 300C as desired by the user.

Kit:

In other embodiments, it should be appreciated that the fly mask 100/100' may be provided as an unassembled kit of one or more of the sections 300A, 300B, 300AA, 300BB and 300C. In some embodiments, the kit may include the face sections 300A and 300B (face mask portion 460A), the crown sections 300AA and 300BB (crown mask portion 460B), and the nose section 300C. In other embodiments, the kit may include the face sections 300A and 300B (face mask portion 460A), and the crown sections 300AA and 300BB (crown mask portion 460B). And in other embodiments the kit may include the crown sections 300AA and 300BB (crown mask portion 460B) and the nose section 300C. It should be appreciated that in some embodiments, the kits may optionally include removable ear covers 550A-B. Still yet, it should be appreciated that the kit may include various ridged/molded protrusions or lens previously discussed.

It is also contemplated that a kit may provide multiple sets of face sections 300A-B, multiple sets of crown sections 300AA-BB, multiple nose sections 300C, and multiple ear covers 550A-B that are each of different sizes to accommodate animals, such as horses, having different head, crown, nose and ear dimensions. For example, a given kit may include multiple face sections 300A-B of different sizes; a given kit may include multiple crown sections 300AA-BB of different sizes; a given kit may include multiple nose sections 300C of different sizes; a given kit may include multiple crown sections 300AA-BB having different sizes, which also include ear covers 550 of different sizes; and it is contemplated that kits of any one or more of the foregoing may be provided.

In addition, kits having sections 300 and ear covers 550 of different dimensions allows the fly mask 100/100' to achieve a customized and comfortable fit for the animal 10, which is highly desirable. Providing various kits having multiple face sections 300A-B, multiple crown sections 300AA-BB, multiple nose sections 300C, and multiple ear covers 550A-B of different shapes/sizes allows the fly mask 100/100' to provide a customized fit to a variety of animals. For example, the kit could accommodate horses of various shapes/sizes, as well as mules, zebras, donkeys and the like of all shapes/sizes.

It should also be appreciated that kits may also be configured to include a single/individual or multiple replacement components, such as replacement face sections 300A and/or 300B, replacement crown sections 300AA and/or 300BB, replacement nose section 300C and a replacement ear sections 550A and/or 550B. Such individual replacement sections 300 and ear covers 550A-B allow the fly mask 100/100' to be readily maintained when it is worn or damaged, which is highly convenient.

Figure 4:
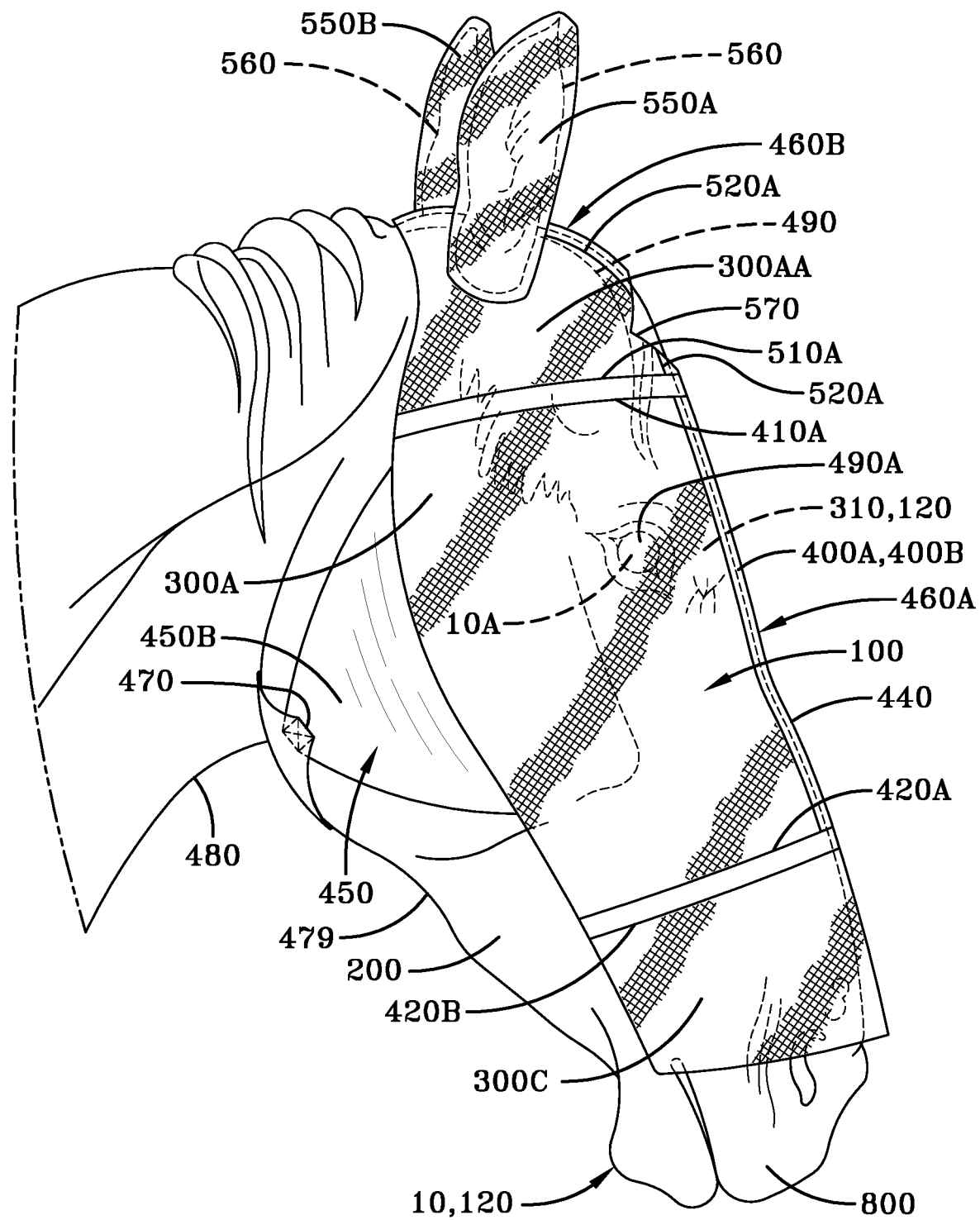
FIG. 4 is a side elevational view of the fly mask when worn on the head of a horse in accordance with the various concepts disclosed herein.
Figure 5:
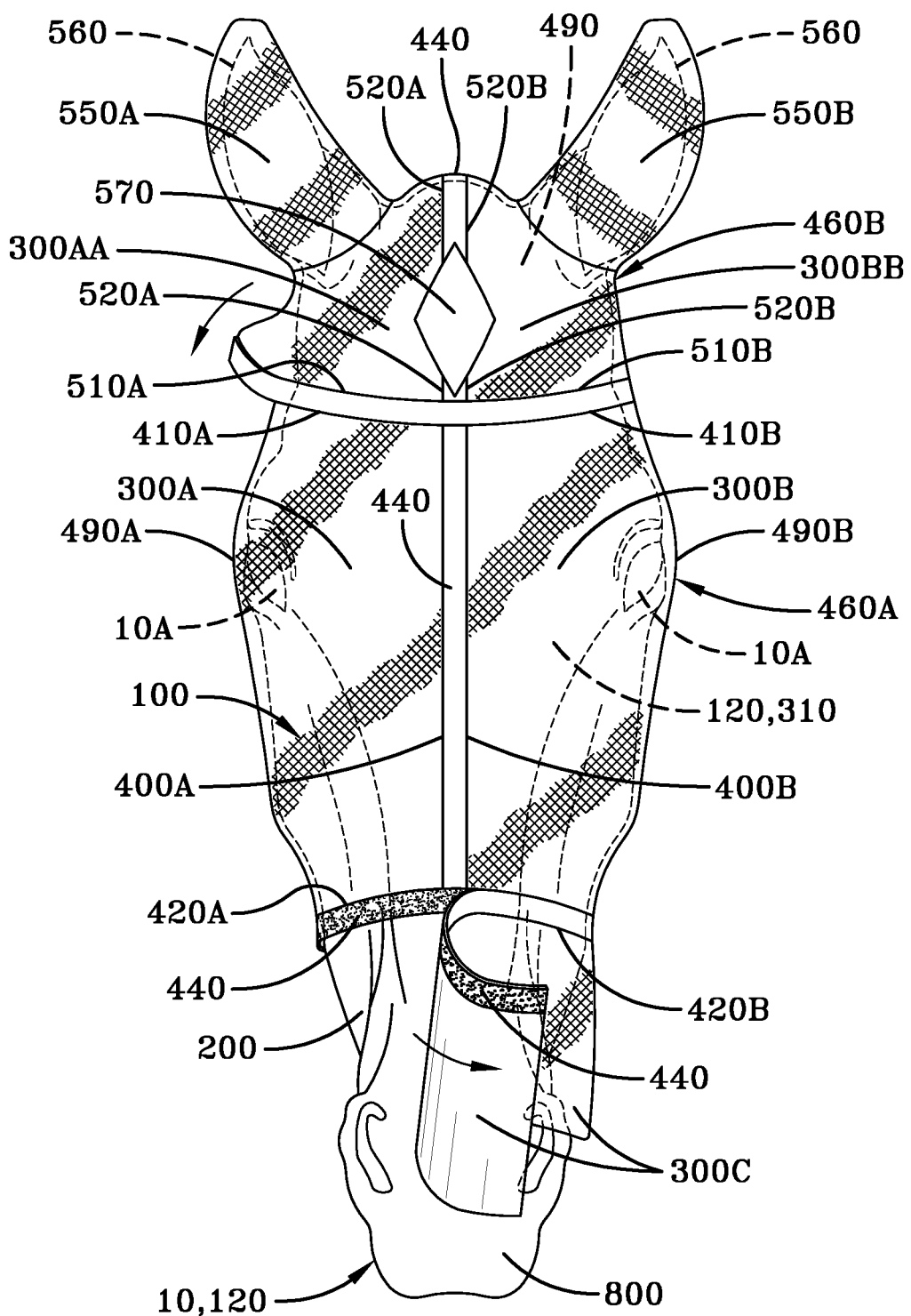
FIG. 5 is another front perspective view of the fly mask worn by a horse, whereby a nose section provided by the fly mask is shown as being removed in accordance with the various concepts disclosed herein.
Figure 6:
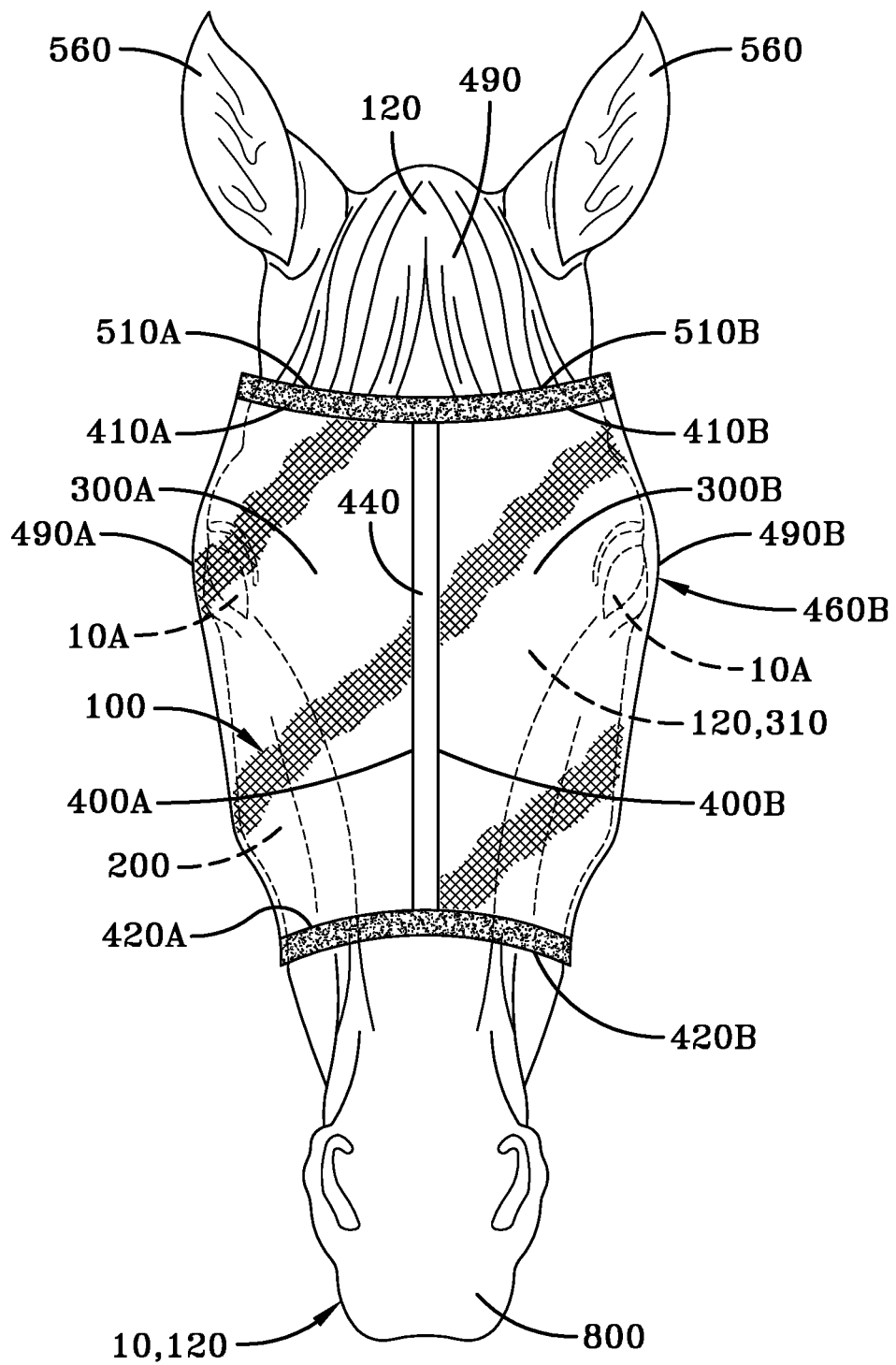
FIG. 6 is another front perspective view of the fly mask worn by a horse, whereby the nose section and a crown mask section of the fly mask are removed leaving only the face mask section attached to the horse in accordance with the various concepts disclosed herein.

Use:

To place the fly mask 100/100' into use, it is assembled from the face mask portion 460A, the crown mask portion 460B and the nose section 300C, which are attached together via the fastener 440. The completed face mask 100/100' is placed on the head 120 of the horse 10, such that the ear covers 550A-B receive the horse's ears 560 therein, while the nose section 300C is positioned over or proximate to the horse's nose 800. The face sections 300A and 300B are then attached to each other in front of the horse's neck 480 using the retention device or fastener 450 as shown in FIGS. 3-4.

Thus, during use, the fly mask 100' is placed on the head 120 of the animal 10, such as a horse, whereby the support strap 900 is placed over rear portion 940 of the horse's neck 480 and behind the ears 560 of the horse 10. In addition, the ears 560 of the horse 10 are placed through the openings 558 in the crown section 300AA-BB. Finally, the retaining straps 450A-B are attached together by the fastener 470 to secure the face sections 300A-B together as previously discussed, thereby attaching the face mask portion 460A to the horse 10.

Optionally, the crown sections 300AA-BB of the fly mask 100' may be removed, leaving the face sections 300A-B remaining and attached to the head 120 of the horse 10 by the support strap 900 and the retaining straps 450A-B. As such, the fly mask 100' allows the face sections 300A-B to be used with or without the crown sections 300AA-BB.

Therefore, it can be seen that the objects of the various embodiments disclosed herein have been satisfied by the structure and its method for use presented above. While in accordance with the Patent Statutes, only the best mode and preferred embodiments have been presented and described in detail, with it being understood that the embodiments disclosed herein are not limited thereto or thereby. Accordingly, for an appreciation of the true scope and breadth of the embodiments, reference should be made to the following claims.

What is claimed is:

1. A fly mask for an animal comprising:
a first face section having a first edge;
a first elongated fastener attached to said first edge;
a second face section having a second edge;
a second elongated fastener attached to said second edge, wherein said first elongated fastener and said second elongated fastener are configured to be removably attached to each other, and wherein when said first and second elongated fasteners are attached together said first edge and said second edge overlap each other and extend over the face and between the eyes of the animal, wherein said first face section includes a first edge fastener, and said second face section includes a second edge fastener;
a fastener device attached to said first and second face sections, said fastener device adapted to releasably attach said first and second face sections together proximate to the neck of the animal;
a first crown section having a first crown fastener;
a second crown section having a second crown fastener, wherein said second crown section is removably attached to said first crown section;
a first support strap attached to said first face section, wherein said first support strap includes a first strap fastener; and
a second support strap attached to said second face section, wherein said second support strap includes a second strap fastener,
wherein said first and second support straps are removably attachable to each other, and
wherein when said first and second support straps are attached to each other, said first and second support straps rest upon the head and are positioned behind the ears of the animal, and wherein said attached first and second support straps together with an edge of said first and second face sections define an opening through which the crown of the head of the animal extends therethrough, and
wherein said first crown fastener of said first crown section is configured to be removably attached to at least said first edge fastener and said first strap fastener, and said second crown fastener of said second crown section is configured to be removably attached to at least said second edge fastener and said second strap fastener.

2. The fly mask of claim 1, wherein said first and second crown sections each include an opening adapted to receive an ear of the animal therethrough.

3. The fly mask of claim 2, further comprising an ear cover removably attached to each said opening, wherein said ear covers are configured to receive the ears of the animal therein.

4. The fly mask of claim 1, further comprising:
a nose section removably attached to at least one of said face sections, said nose section adapted to be positioned proximate to the nose of the animal.

5. The fly mask of claim 1, wherein said first and second face sections comprise at least partially light-transparent material.

6. The fly mask of claim 1, wherein said first and second face sections comprise porous material.

7. The fly mask of claim 1, wherein said first and second face sections comprise fabric.

8. The fly mask of claim 1, wherein said first elongated fastener extends the full length of said first elongated edge, and wherein said second elongated fastener extends the full length of said second elongated edge.

9. The fly mask of claim 1, wherein said first elongated fastener and said second elongated fastener are hook and loop fasteners.

10. A fly mask kit for an animal comprising:
a first face section having a first edge;
a second face section having a second edge;
a first elongated fastener attached to said first edge;
a second elongated fastener attached to said second edge, wherein said first elongated fastener and said second elongated fastener are configured to be removably attached to each other, and wherein when said first and second elongated fasteners are attached together said first edge and said second edge overlap each other and extend over the face and between the eyes of the animal, wherein said first and second face sections are configured to be removably joined together proximate to the neck of the animal, and wherein said first face section includes a first edge fastener, and said second face section includes a second edge fastener;
a first crown section having a first crown fastener;
a second crown section having a second crown fastener, wherein said second crown section is configured to be removably attached to said first crown section;
a first support strap attached to said first face section, wherein said first support strap includes a first strap fastener; and
a second support strap attached to said second face section, wherein said second support strap includes a second strap fastener, and wherein said first and second support straps are configured to be removably attachable to each other;
wherein when said first and second support straps are attached to each other, said first and second support straps rest upon the head and are positioned behind the ears of the animal, and wherein said attached first and second support straps together with and edge of said first and second face sections define an opening through which the crown of the head of the animal extends therethrough, and
wherein said first crown fastener of said first crown section is configured to be removably attached to at least said first edge fastener and said first strap fastener, and said second crown fastener of said second crown section is configured to be removably attached to at least said second edge fastener and said second strap fastener.

11. The fly mask kit of claim 10, further comprising:
a nose section configured to be removably attached to at least one of said first and second face sections, said nose section adapted to be positioned proximate to the nose of the animal.

12. The fly mask kit of claim 11, wherein said first and second face sections comprise at least partially light-transparent material.

13. The fly mask kit of claim 11, further comprising a plurality of said first face sections and a plurality of said second face sections, wherein said plurality of said first face sections and said plurality of said second face sections are different sizes.

14. The fly mask kit of claim 11, further comprising a plurality of said first crown sections and a plurality of said second crown sections, wherein said plurality of said first crown sections and said plurality of said second crown sections are different sizes.

15. The fly mask kit of claim 11, further comprising a plurality of said nose sections that are different sizes.

16. The fly mask kit of claim 10, wherein said first and second crown sections each include an opening adapted to receive an ear of the animal therethrough.

17. The fly mask kit of claim 16, further comprising:
an ear cover configured to be removably attached to each said opening, wherein said ear covers are configured to receive the ears of the animal therein.

18. A fly mask kit for an animal comprising:
a first face section having a first elongated edge;
a second face section having a second elongated edge;
a first elongated fastener attached to said first face section extending parallel to said first elongated edge;
a second elongated fastener attached to said second face section extending parallel to said second elongated edge, wherein said first elongated fastener and said second elongated fastener are configured to be removably attached to each other, and wherein when said first and second elongated fasteners are attached together said first edge and said second edge overlap each other and extend over the face and between the eyes of the animal, wherein said first and second face sections are configured to be removably joined together proximate to the neck of the animal, wherein said first face section includes a first edge fastener, and said second face section includes a second edge fastener;
a first crown section having a first crown fastener;
a second crown section having a second crown fastener, wherein said second crown section is configured to be removably attached to said first crown section;
a first support strap attached to said first face section, wherein said first support strap includes a first strap fastener;
a second support strap attached to said second face section, wherein said second support strap includes a second strap fastener, and wherein said first and second support straps are configured to be removably attachable to each other,
wherein when said first and second support straps are attached to each other, said first and second support straps rest upon the head and are positioned behind the ears of the animal, and wherein said attached first and second support straps together with an edge of said first and second face sections define an opening through which the crown of the head of the animal extends therethrough,
wherein said first crown fastener of said first crown section is configured to be removably attached to at least said first edge fastener and said first strap fastener, and said second crown fastener of said second crown section is configured to be removably attached to at least said second edge fastener and said second strap fastener.

19. The fly mask kit of claim 18, further comprising:
a nose section configured to be removably attached to at least one of said first and second face sections, said nose section adapted to be positioned proximate to the nose of the animal.

* * * * *